United States Patent [19]

Pozzi

[11] Patent Number: 5,269,359
[45] Date of Patent: Dec. 14, 1993

[54] LIGHT-WEIGHT ROLL-UP AWNING

[75] Inventor: Carlo M. Pozzi, Ruvigliana, Switzerland

[73] Assignee: Fiamma S.p.A., Cardanoal Campo, Italy

[21] Appl. No.: 972,047

[22] Filed: Nov. 5, 1992

[30] Foreign Application Priority Data

Jun. 3, 1992 [EP] European Pat. Off. ......... 92401505

[51] Int. Cl.$^5$ .............................................. E04F 10/00
[52] U.S. Cl. ........................................ 160/46; 160/66; 135/89
[58] Field of Search ............... 160/46, 59, 60, 66, 160/67, 80, 22; 135/89, 87, 106, 107, 109, 112, 117

[56] References Cited

U.S. PATENT DOCUMENTS

| | | |
|---|---|---|
| 1,764,367 | 2/1928 | Szymanski . |
| 1,801,014 | 4/1931 | Lange et al. ................ 135/107 |
| 2,660,186 | 11/1953 | Marshall et al. ............ 135/112 |
| 2,886,047 | 5/1959 | Healy ...................... 135/107 X |
| 4,171,013 | 10/1979 | Clark . |
| 4,724,882 | 2/1988 | Wang ........................ 160/46 X |

FOREIGN PATENT DOCUMENTS 2836663  3/1980  Fed. Rep. of Germany .

Primary Examiner—Blair M. Johnson
Attorney, Agent, or Firm—Theodore F. Shiells

[57] ABSTRACT

An awning retractable by being wound onto a roller and associated with legs permitting it to be maintained in position above the area to be sheltered when unrolled. The roller (1) is hollow, and the legs (2, 3) of the awning, which are foldable so that in the folded state their length is about one-half that of the roller, are adapted to fit into the roller when the awning is rolled up. Instead of being permanently attached to a mounting wall for the awning, the roller is preferably fastened to the free edge of the awning so that it accompanies the unrolling thereof.

15 Claims, 4 Drawing Sheets

FIG.:1

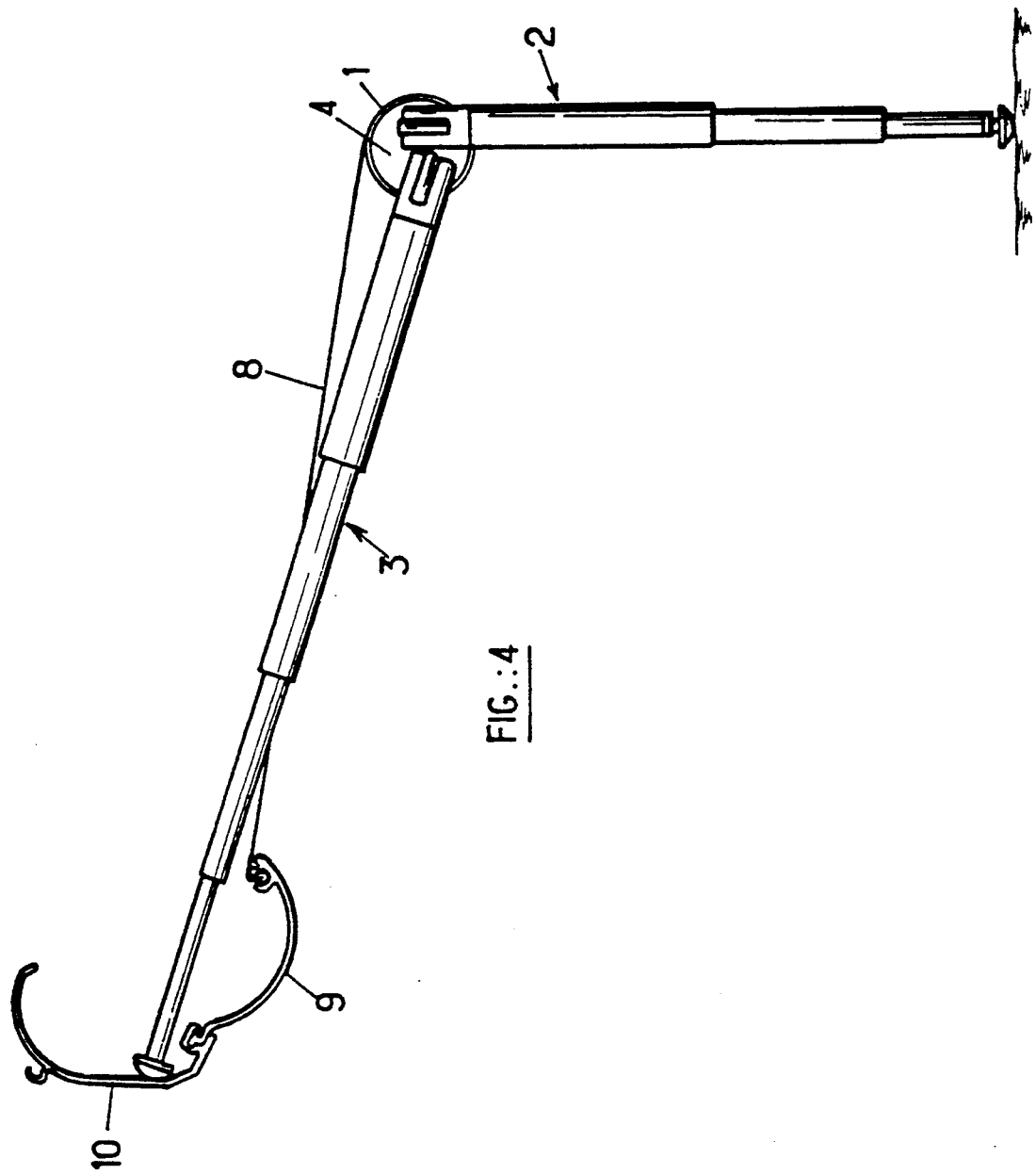
FIG.:4

LIGHT-WEIGHT ROLL-UP AWNING

The invention relates to an awning which is adapted to be retracted by being wound onto a roller and is associated with legs which permit it to be maintained in position above the area to be sheltered when it is unrolled.

Such awnings are already known and used on vehicles such as campers to provide an area of shade and rest on one side of the vehicle when it has stopped. However, the known awnings are generally heavy, mainly because of the arrangement of articulated arms which serve to stretch the cloth and are themselves articulated to the legs.

Because of their weight, they cannot be used on light vehicles whose body does not have sufficient strength.

The object of the invention is to provide a relatively light-weight awning that can be supported by a wall or vehicle body of low mechanical strength.

A first characteristic of the invention is that the roller is hollow and that the legs of the awning, which are preferably telescopic so that when folded their length is about one-half that of the awning, are adapted to be accommodated in the roller when the awning is rolled up.

A second characteristics of the invention, preferably combined with the first, is that instead of being permanently attached to the wall on which the awning is mounted, the roller is fastened to the free edge of the cloth so that it follows the unrolling thereof and may, moreover, facilitate it because of its weight.

Since the legs can remain inside the roller during the unrolling, to be withdrawn therefrom only after unrolling has been completed, the legs may advantageously be articulated to a kind of piston displaceable in translation and in rotation within the roller, so that after unrolling it is easy to withdraw the legs from the roller and to extend them so they can serve their purpose.

Other characteristics of the invention will become apparent from the description of the drawing, attached by way of example.

FIG. 4 is a similar view of the awning, unrolled and stretched.

Figure 1:
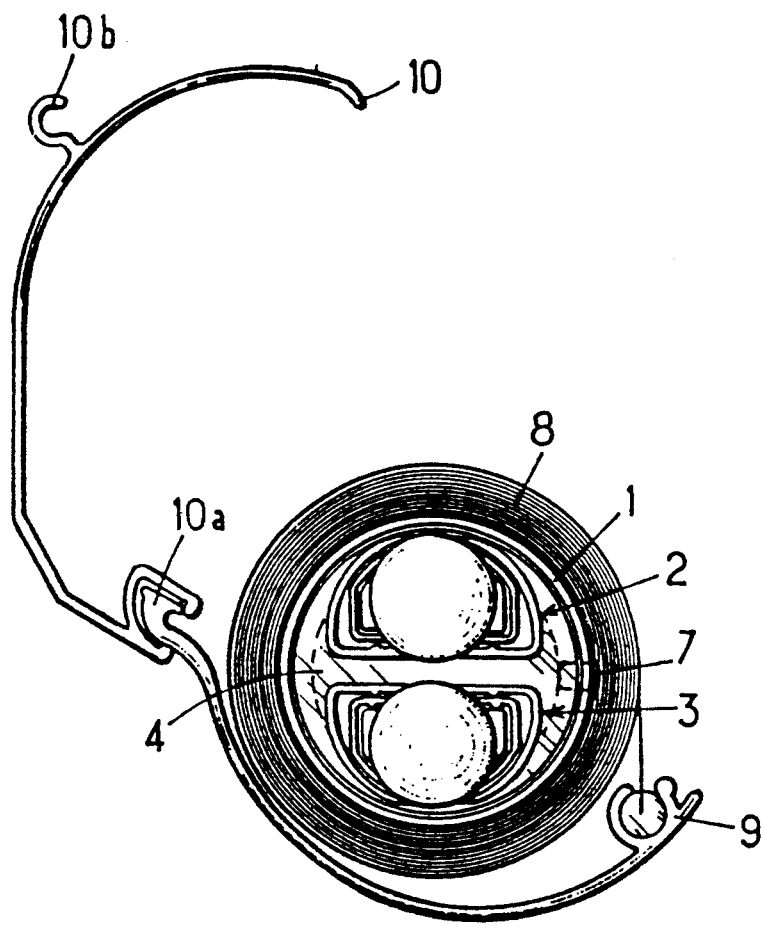
FIG. 1 is an end view of the roller, with the cloth completely rolled up and the legs placed inside the roller.

In the drawings, 1 designates the roller, consisting of a hollow cylinder made of aluminum, for example, onto which the cloth 8 of the awning is wound.

When at rest, with the cloth completely wound onto the roller, the whole can be placed into a case provided with a cover 10 articulated at 10a, one of the lengthwise edges of the cloth being fastened at 9 to the case by any appropriate means. (FIG. 1.) The closed case containing the awning may be stowed in the vehicle or attached to a side of the vehicle body with hooks such as 10b.

Figure 2:
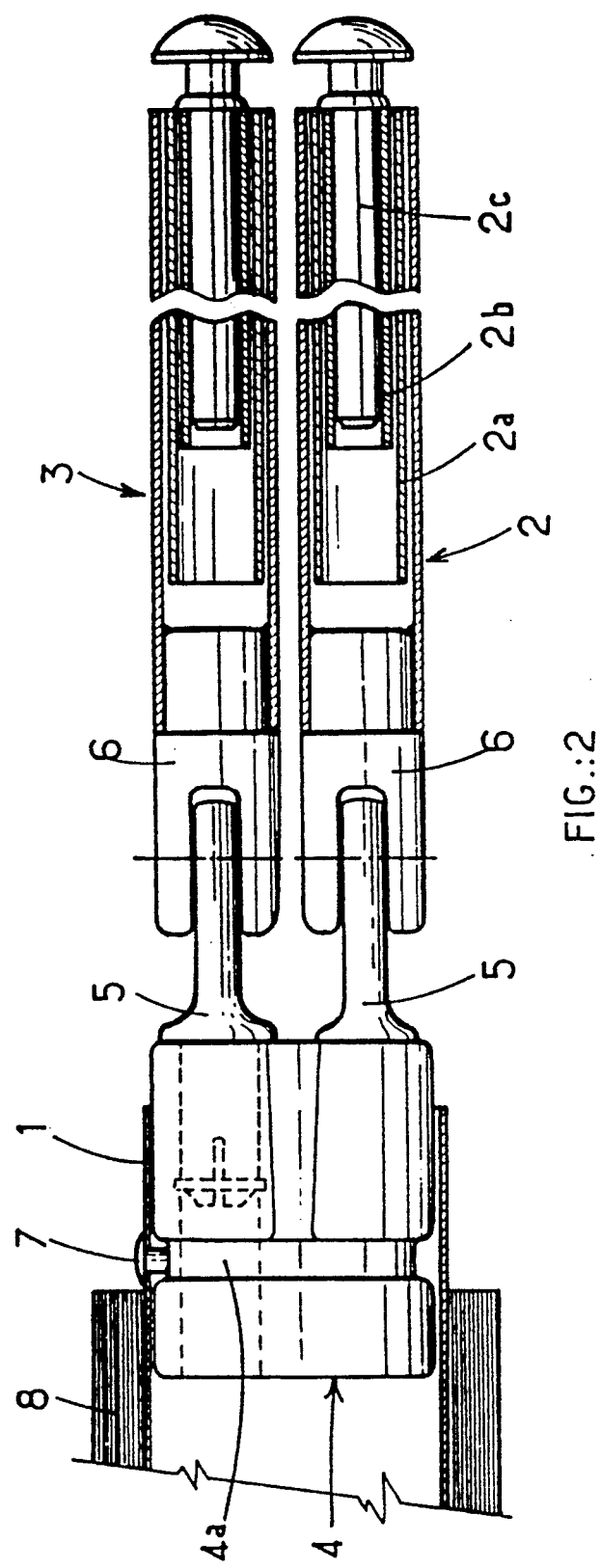
FIG. 2 shows one end of the roller in an axial view, the legs, still folded, having been pulled out of the roller.

At each end of the cylinder 1 there is a pair of legs, 2 and 3, one of which is shown in FIG. 2. These legs are formed of portions 2a, 2b and 2c which are adapted to slide in one another and thus are telescopically extendable and retractable, these portions 2a, 2b and 2c being of such number that the length of the retracted legs can be accommodated in the roller 1 at each end thereof.

Within the cylinder 1 there is a kind of piston 4 which is free to turn therein and can also be displaced in translation in the cylinder when it is desired to push the legs back in, or, conversely, pull them out. (Position of FIG. 2.) Shown in the drawing is a spring stop 7 mounted on the cylinder and seated in a circular groove 4a of the piston 4, which causes the piston 4 to be held in the position in which the legs are out while allowing it to turn. When it is desired to push the piston with the legs back in, a little force has to be applied to elastically dislodge the stop from the groove. Each of the telescopic legs is articulated, about an axis that is perpendicular to the axis of the cylinder 1, to a finger 5 carried by the piston 4. Each of these fingers in turn is able to revolve relative to the piston 4 about an axis parallel to the axis of the cylinder.

When the awning is not in use, the pistons 4 are pushed into the cylinder, along with the folded legs 2 and 3, and the whole has the appearance shown in FIG. 1 at each end of the cylinder.

Figure 3:
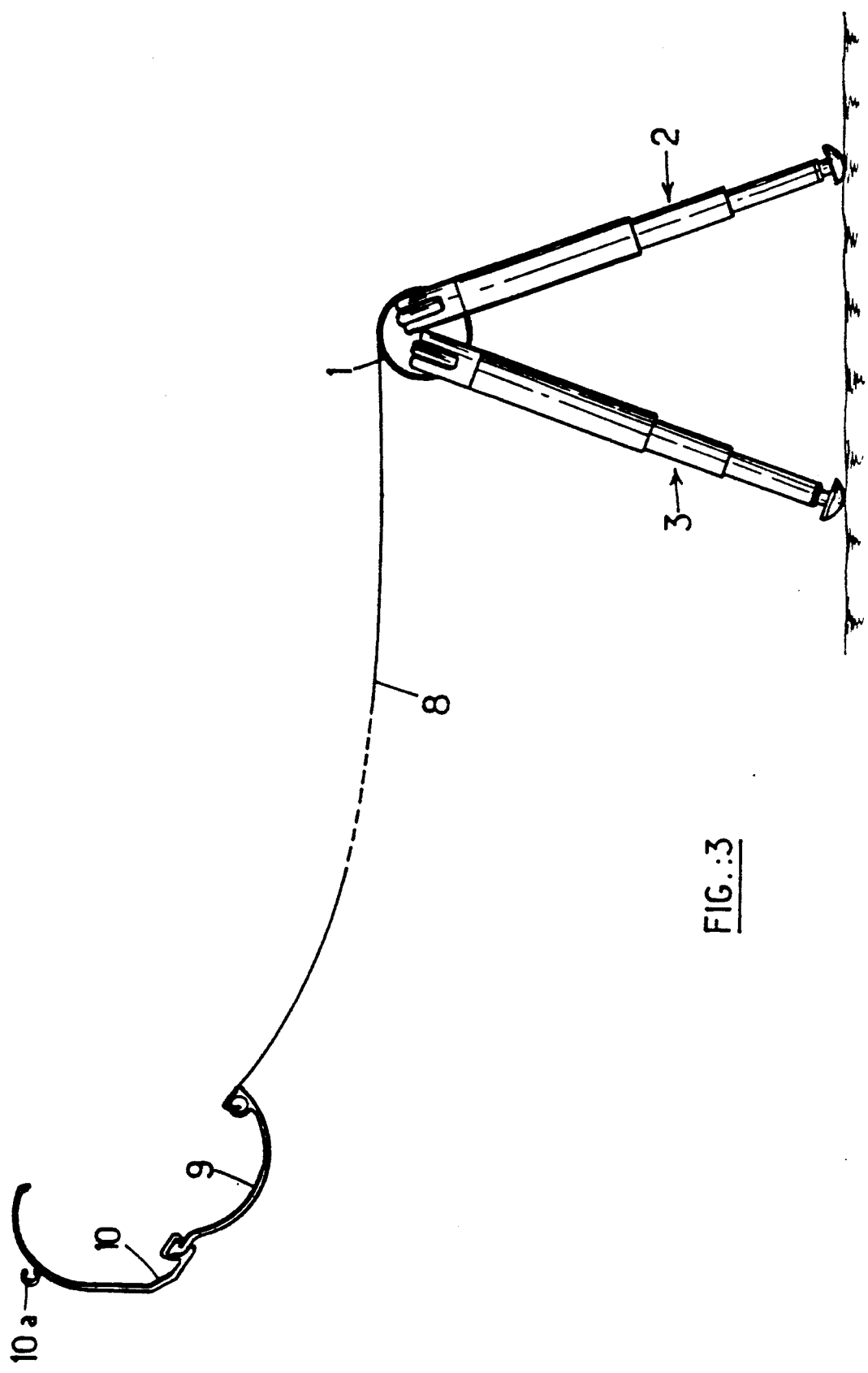
FIG. 3 is a diagrammatic front view of the awning being unrolled.

When the awning is to be placed in service, the case 9 and 10 is opened, the roller is taken out of it by holding it by its two ends, the legs are pulled out (position shown in FIG. 2), and unrolling of the cloth is begun, with the starting of unrolling aided by the weight of the roller and of the legs. Because of the two articulations of each leg to its piston 4, the legs can be placed into a position such as that shown in FIG. 3, in which they form a kind of horse permitting the weight of the cylinder to be supported with the cloth unrolled.

When a sufficient length of the cloth has been unrolled, the position of the legs can be adjusted and one of them can be placed at each end (FIG. 3), adjusted to its maximum length, along a small side of the cloth to form a stretching device by being propped against the case or any other stop that may be provided. (FIG. 4.)

The case with its cover is made of a light-weight material having a certain rigidity, for example, extruded aluminum. Hooks 10a permit it to be suspended from a wall.

Rolling up and unrolling can be facilitated by mounting at one or both ends of the roller a small electric motor whose stator is held in the hand and whose rotor is connected to the cylinder 1 by gears.

I claim:

1. An awning comprising a hollow roller and an attached cloth, said cloth being retractable by being wound onto said roller, said awning further including legs positionable to permit it to be maintained in position above an area to be sheltered when said cloth has been unrolled, said roller being hollow and said legs of the awning being foldable to the extent that in the folded state their length is about one-half that of the roller, said legs being adapted to fit into the roller when the cloth of said awing is rolled up.

2. An awning as defined in claim 1, said roller being adapted to be fixedly attached to a mounting wall for the awning.

3. An awning as defined in claim 1, wherein the legs are telescopically foldable.

4. An awning as defined in claim 1, wherein two legs are provided at each end of the roller, each leg being articulated to a piston displaceable in translation within the roller.

5. An awning as defined in claim 4, wherein the piston is free to turn inside the roller.

6. An awning as defined in claim 5, wherein the piston comprises a circular groove into which a detent pin projects when the piston is in the position in which the legs have been pulled out.

7. An awning as defined in claim 4, wherein each leg is attached to the piston through a dual articulation having an axis parallel to that of the cylinder and a second, perpendicular axis.

8. An awning as defined in claim 4, wherein one of the legs is positionable between said mounting wall and said roller has a length suitable for forming a stretching device along a side of the cloth.

9. An awning as defined in claim 1, said roller being fastened to the free edge of the cloth so that is accompanies the unrolling thereof.

10. An awning as defined in claim 9, wherein the legs are telescopically foldable.

11. An awning as defined in claim 9, wherein two legs are provided at each end of the roller, each leg being articulated to a piston displaceable in translation within the roller.

12. An awning as defined in claim 11, wherein the piston is free to turn inside the roller.

13. An awning as defined in claim 11, wherein the piston comprises a circular groove into which a detent pin projects when the piston is in the position in which the legs have been pulled out.

14. An awning as defined in claim 11, wherein each leg is attached to the piston through a dual articulation having an axis parallel to that of the cylinder and a second, perpendicular axis.

15. An awning as defined in claim 11, wherein one of the legs is positionable between said mounting wall and said roller and has a length suitable for forming a stretching device along a side of the cloth.

* * * * *